(12) United States Patent
Boss et al.

(10) Patent No.: US 8,812,352 B2
(45) Date of Patent: Aug. 19, 2014

(54) ENVIRONMENTAL STEWARDSHIP BASED ON DRIVING BEHAVIOR

(75) Inventors: Gregory Jensen Boss, Saginaw, MI (US); Rick Allen Hamilton, II, Charlottesville, VA (US); Jacquelyn Annette Martino, Cold Spring, NY (US); Clifford Alan Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 12/578,653

(22) Filed: Oct. 14, 2009

(65) Prior Publication Data
US 2011/0087525 A1    Apr. 14, 2011

(51) Int. Cl.
*G07B 15/00* (2011.01)
*G07B 15/02* (2011.01)
*G06Q 10/00* (2012.01)
*G06Q 30/00* (2012.01)
*G06F 17/00* (2006.01)
*G06G 7/00* (2006.01)

(52) U.S. Cl.
USPC ............ 705/13; 705/1.1; 705/7.11; 705/14.1; 705/14.25; 705/400

(58) Field of Classification Search
USPC .............. 705/1.1, 5, 13, 7.11–7.42, 400–418, 705/14.1–14.25
See application file for complete search history.

(56) References Cited

U.S. PATENT DOCUMENTS

| | | | |
|---|---|---|---|
| 4,336,522 A | 6/1982 | Graham | |
| 5,086,389 A | 2/1992 | Hassett et al. | |
| 5,489,777 A | 2/1996 | Stedman et al. | |
| 5,532,690 A | 7/1996 | Hertel | |
| 5,583,765 A | 12/1996 | Kleehammer | |
| 5,694,322 A | 12/1997 | Westerlage et al. | |
| 5,717,389 A | 2/1998 | Mertens et al. | |

(Continued)

FOREIGN PATENT DOCUMENTS

| | | |
|---|---|---|
| AU | 2007100542 | 12/2007 |
| DE | 19634340 | 2/1998 |

(Continued)

OTHER PUBLICATIONS

Brian Carr, "Fuel Economy Tip-Tailgating Doesn't Help", Daily Fuel Economy Tip, May 27, 2006, retrieved from http://www.dailyfueleconomytip.com/driving-habits/fuel-economy-tip-tailgating-doesnt-help/.*

(Continued)

*Primary Examiner* — George Chen
(74) *Attorney, Agent, or Firm* — Schmeiser, Olsen & Watts; John Pivnichny

(57) ABSTRACT

A method and system for managing driving patterns by charging a variable incentive and/or disincentive based on individual driving behaviors. Distances detected between a vehicle and other vehicles are detected within a time period. N tailgating incidents are identified based on the detected distances being less than a threshold value for distance. A variable toll is determined by evaluating a function of a base amount and N. The driver of the vehicle is charged the variable toll. Charging the variable toll provides an incentive to the driver to encourage driving that does not include tailgating or a disincentive to the driver to deter tailgating.

20 Claims, 4 Drawing Sheets

(56) References Cited

U.S. PATENT DOCUMENTS

| | | |
|---|---|---|
| 5,825,007 A | 10/1998 | Jesadanont |
| 5,864,831 A | 1/1999 | Schuessler |
| 5,892,463 A | 4/1999 | Hikita et al. |
| 5,920,057 A | 7/1999 | Sonderegger et al. |
| 6,018,699 A | 1/2000 | Baron, Sr. et al. |
| 6,078,895 A | 6/2000 | Ryu et al. |
| 6,104,299 A | 8/2000 | Brusseaux et al. |
| 6,234,390 B1 | 5/2001 | Rabe |
| 6,356,838 B1 | 3/2002 | Paul |
| 6,405,132 B1 | 6/2002 | Breed |
| 6,411,889 B1 | 6/2002 | Mizunuma et al. |
| 6,525,673 B1 | 2/2003 | Feldman |
| 6,603,405 B2 | 8/2003 | Smith |
| 6,604,045 B2 | 8/2003 | Kuroda et al. |
| 6,661,352 B2 | 12/2003 | Tiernay et al. |
| 6,693,555 B1 | 2/2004 | Colmenarez et al. |
| 6,696,981 B1 | 2/2004 | Hashimoto |
| 6,700,504 B1 | 3/2004 | Aslandogan et al. |
| 6,738,697 B2 | 5/2004 | Breed |
| 6,843,101 B2 | 1/2005 | Hok |
| 6,845,362 B2 | 1/2005 | Furuta et al. |
| 6,959,282 B2 | 10/2005 | Kakihara et al. |
| 7,003,398 B2 | 2/2006 | Seligmann |
| 7,053,792 B2 | 5/2006 | Aoki et al. |
| 7,127,413 B1 | 10/2006 | Yanagisawa et al. |
| 7,215,255 B2 | 5/2007 | Grush |
| 7,308,358 B2 | 12/2007 | Nozaki et al. |
| 7,320,430 B2 | 1/2008 | Dawson et al. |
| 7,343,341 B2 | 3/2008 | Sandor et al. |
| 7,375,648 B1 | 5/2008 | Mulka et al. |
| 7,385,525 B2 | 6/2008 | Ho et al. |
| 7,398,924 B2 | 7/2008 | Dawson et al. |
| 7,415,418 B2 | 8/2008 | Zimmerman |
| 7,426,489 B2 | 9/2008 | van Soestbergen et al. |
| 7,580,808 B2 | 8/2009 | Bos |
| 7,797,267 B2 | 9/2010 | Horvitz |
| 7,908,149 B2 | 3/2011 | Dar et al. |
| 7,966,221 B1 | 6/2011 | Givoly et al. |
| 7,969,325 B2 | 6/2011 | Hamilton, II et al. |
| 7,979,292 B2 | 7/2011 | Hamilton, II et al. |
| 8,055,534 B2 | 11/2011 | Ashby et al. |
| 8,073,460 B1 | 12/2011 | Scofield et al. |
| 8,200,529 B2 | 6/2012 | Hamilton, II et al. |
| 8,219,115 B1 | 7/2012 | Nelissen |
| 8,332,270 B2 | 12/2012 | Sprigg et al. |
| 8,374,911 B2 | 2/2013 | Glachant et al. |
| 8,385,944 B1 | 2/2013 | Nelissen |
| 8,447,661 B2 | 5/2013 | Wiseman et al. |
| 8,478,603 B2 | 7/2013 | Boss et al. |
| 2001/0037174 A1 | 11/2001 | Dickerson |
| 2001/0056396 A1 | 12/2001 | Goino |
| 2002/0049630 A1 | 4/2002 | Furuta et al. |
| 2002/0065604 A1 | 5/2002 | Sekiyama |
| 2002/0072963 A1 | 6/2002 | Jonge |
| 2002/0084917 A1 | 7/2002 | Hauptman et al. |
| 2002/0103769 A1 | 8/2002 | Smith |
| 2002/0115410 A1 | 8/2002 | Higashino et al. |
| 2003/0037538 A1 | 2/2003 | Rendahl et al. |
| 2003/0040944 A1 | 2/2003 | Hileman |
| 2003/0065630 A1 | 4/2003 | Brown et al. |
| 2003/0110075 A1 | 6/2003 | Shioda et al. |
| 2003/0115095 A1 | 6/2003 | Yamauchi |
| 2003/0191568 A1 | 10/2003 | Breed |
| 2003/0233321 A1 | 12/2003 | Scolini et al. |
| 2004/0039517 A1 | 2/2004 | Biesinger et al. |
| 2004/0049424 A1 | 3/2004 | Murray et al. |
| 2004/0075582 A1 | 4/2004 | Bergan et al. |
| 2004/0093264 A1 | 5/2004 | Shimizu |
| 2004/0119609 A1 | 6/2004 | Solomon |
| 2004/0167861 A1 | 8/2004 | Hedley |
| 2004/0212518 A1 | 10/2004 | Tajima et al. |
| 2005/0001739 A1 | 1/2005 | Sudou et al. |
| 2005/0003802 A1 | 1/2005 | Joseph |
| 2005/0024189 A1 | 2/2005 | Weber |
| 2005/0049781 A1 | 3/2005 | Oesterling |
| 2005/0168351 A1 | 8/2005 | Saze et al. |
| 2005/0179563 A1 | 8/2005 | Kelley |
| 2005/0187820 A1 | 8/2005 | Mohan |
| 2005/0246190 A1 | 11/2005 | Sandor et al. |
| 2005/0256762 A1 | 11/2005 | Dar et al. |
| 2005/0278214 A1 | 12/2005 | Takida |
| 2006/0015394 A1 | 1/2006 | Sorensen |
| 2006/0099964 A1 | 5/2006 | Barrese et al. |
| 2006/0136291 A1 | 6/2006 | Morita et al. |
| 2006/0155486 A1 | 7/2006 | Walsh et al. |
| 2006/0173579 A1 | 8/2006 | Desrochers et al. |
| 2006/0255967 A1 | 11/2006 | Woo et al. |
| 2006/0278705 A1 | 12/2006 | Hedley et al. |
| 2007/0050279 A1 | 3/2007 | Huang et al. |
| 2007/0061057 A1 | 3/2007 | Huang et al. |
| 2007/0063858 A1 | 3/2007 | Lee et al. |
| 2007/0083322 A1 | 4/2007 | Van Ee |
| 2007/0100687 A1 | 5/2007 | Yoshikawa |
| 2007/0106465 A1 | 5/2007 | Adam et al. |
| 2007/0131864 A1 | 6/2007 | Ellis et al. |
| 2007/0135990 A1 | 6/2007 | Seymour et al. |
| 2007/0203642 A1 | 8/2007 | Arnold-Huyser |
| 2007/0260393 A1 | 11/2007 | Abernethy et al. |
| 2007/0268140 A1 | 11/2007 | Tang et al. |
| 2007/0271034 A1 | 11/2007 | Perry |
| 2007/0271035 A1 | 11/2007 | Stoschek et al. |
| 2007/0278300 A1 | 12/2007 | Dawson et al. |
| 2007/0299607 A1 | 12/2007 | Cubillo |
| 2008/0004926 A1 | 1/2008 | Horvitz et al. |
| 2008/0021723 A1 | 1/2008 | Devarakonda |
| 2008/0033644 A1 | 2/2008 | Bannon |
| 2008/0086310 A1 | 4/2008 | Campbell |
| 2008/0091341 A1 | 4/2008 | Panabaker et al. |
| 2008/0120024 A1 | 5/2008 | Obradovich et al. |
| 2008/0129548 A1 | 6/2008 | Firestone |
| 2008/0140318 A1 | 6/2008 | Breed |
| 2008/0148816 A1 | 6/2008 | Groves |
| 2008/0161989 A1 | 7/2008 | Breed |
| 2008/0175438 A1 | 7/2008 | Alves |
| 2008/0195428 A1 | 8/2008 | O'Sullivan |
| 2008/0208680 A1 | 8/2008 | Cho |
| 2008/0221948 A1 | 9/2008 | Eglen et al. |
| 2008/0236141 A1 | 10/2008 | Peng et al. |
| 2009/0018902 A1 | 1/2009 | Miller et al. |
| 2009/0157307 A1 | 6/2009 | Krumm et al. |
| 2009/0157540 A1 | 6/2009 | Black et al. |
| 2009/0210261 A1 | 8/2009 | Mortimore |
| 2009/0222338 A1* | 9/2009 | Hamilton et al. ............... 705/14 |
| 2009/0228350 A1 | 9/2009 | Robinson et al. |
| 2009/0287408 A1 | 11/2009 | Gerdes et al. |
| 2009/0295599 A1 | 12/2009 | Coffee et al. |
| 2009/0327148 A1 | 12/2009 | Kamar et al. |
| 2010/0070128 A1 | 3/2010 | Johnson |
| 2010/0085213 A1 | 4/2010 | Turnock et al. |
| 2010/0106567 A1 | 4/2010 | McNew et al. |
| 2010/0153125 A1 | 6/2010 | Hamilton, II et al. |
| 2010/0153191 A1 | 6/2010 | Hamilton, II et al. |
| 2010/0153192 A1 | 6/2010 | Hamilton, II et al. |
| 2010/0153193 A1 | 6/2010 | Ashby et al. |
| 2010/0156670 A1 | 6/2010 | Hamilton, II et al. |
| 2010/0161391 A1 | 6/2010 | Ashby et al. |
| 2010/0161392 A1 | 6/2010 | Ashby et al. |
| 2010/0201505 A1 | 8/2010 | Honary et al. |
| 2010/0205060 A1 | 8/2010 | Athsani et al. |
| 2010/0217525 A1 | 8/2010 | King et al. |
| 2010/0250053 A1 | 9/2010 | Grill et al. |
| 2010/0268449 A1 | 10/2010 | Feng |
| 2010/0332241 A1 | 12/2010 | Boss et al. |
| 2010/0332315 A1 | 12/2010 | Kamar et al. |
| 2011/0071721 A1 | 3/2011 | Gilfillan et al. |
| 2011/0082797 A1 | 4/2011 | Glachant et al. |
| 2011/0087430 A1 | 4/2011 | Boss et al. |
| 2011/0087524 A1 | 4/2011 | Boss et al. |
| 2011/0112908 A1 | 5/2011 | Rowley et al. |
| 2011/0166958 A1 | 7/2011 | Hamilton, II et al. |
| 2012/0078743 A1 | 3/2012 | Betancourt |
| 2013/0080307 A1 | 3/2013 | Hoffberg |

(56) References Cited

U.S. PATENT DOCUMENTS

FOREIGN PATENT DOCUMENTS

| EP | 1519288 | 3/2006 |
| JP | 2000172892 | 6/2000 |
| JP | 2001101561 | 4/2001 |
| JP | 2001283377 | 10/2001 |
| JP | 2002032893 | 1/2002 |
| JP | 2004157842 | 6/2004 |
| WO | 02071366 | 9/2002 |
| WO | 2009065638 | 5/2009 |

OTHER PUBLICATIONS

Boss et al.; Patent Application; Determining Travel Routes by Using Fee-Based Location Preferences; U.S. Appl. No. 12/578,622, filed Oct. 14, 2009.

Boss et al.; Patent Application; Determining Travel Routes by Using Auction-Based Location Preferences; U.S. Appl. No. 12/578,780, filed Oct. 14, 2009.

Piguet et al.; Extremely Low-Power Logic; Proceedings of the Design, Automation and Test in Europe Conference and Exhibition 2004 IEEE; 6 pages.

Xu et al.; A Serializability Violation Detector for Shared-Memory Server Programs; PLDI'05, Jun. 12-15, 2005, Chicago, Illinois, USA; 14 pages.

Holmes, Tiffany; Eco-Visualization: Combining Art and Technology to Reduce Energy Consumption; C&C'07, Jun. 13-15, 2007, Washington, DC, USA; pp. 153-162.

Mao et al.; Route Flap Damping Exacerbates Internet Routing Convergence; SIGCOMM '02, Aug. 19-23, 2002, Pittsburgh, PA, USA; pp. 221-233.

Lindgaard, Gitte; Making the Business Our Business: One Path to Value-Added HCI; Human Oriented Technology Lab, Carleton University, Ottawa, Ontario, Canada; Interactions May and Jun. 2004, pp. 13-17.

Tomaz et al.; TRA; Modeling the spatial parameters for dynamic road pricing; Transport Research Arena Europe 2008, Ljubljana; 7 pages.

Aman et al.; Evaluation of Congestion Pricing for Management Highway in Seattle; 6 pages, May 2009.

Electronic Tolling/Congestion Pricing; U.S. Department of Transportation Federal Highway Administration; 4 pages, Sep. 1, 2009.

Mobile Prompts for Detours Help Reduce Commute Time for Drivers [online]; AT&T News Release; San Antonio, Texas, Jun. 7, 2007; [retrieved on Feb. 28, 20120]. Retrieved from the Internet <URL: http://www.att.com/gen/press-room?pid=4800&cdvn=news&newsarticleid=23918>; 2 pages.

Whoriskey, Peter; Beating Traffic by Joining the Network [online]; [retrieved on Feb. 28, 2012]. Retrieved from the Internet <URL: http://www.washingtonpost.com/wp-dyn/content/story/2008/03/24/ST2008032403495.html>; 2 pages.

Get out of the jam: Avoid traffic with TeleNav GPS Navigator [online]; [retrieved on Feb. 28, 2012]. Retrieved from the Internet <URL: http://www.telenav.com/products/tn/traffic.html>; 2 pages.

Capturing traffic data using GPS-enabled cell phones; Machines Like Us Blog [online]; originally posted Feb. 10, 2008 [retrieved on Feb. 28, 2012]. Retrieved from the Internet <URL: http://web.archive.org/web/20081013102040/http://www.machineslikeus.com/cms/capturing-traffic-data-using-GPS-enabled-cell-phones. html>; 6 pages.

Method for Dynamic Road Status Information Conveyance Under Inclement Conditions; IBM; IP.com Technical Disclosure; IPCOM000177535D; Dec. 17, 2008; 5 pages.

Vehicle Route Planning Based on Real-Time Pollution Monitoring; IBM; IP.com Technical Disclosure; IPCOM000175555D; Oct. 13, 2008; 3 pages.

Dynamic Routing Based on Restricted Area and Policies; IBM; IP.com Technical Disclosure; IPCOM000177536D; Dec. 17, 2008; 5 pages.

Techno junkies meet plow truck operators for safety, security and keeping the honest man, you know, honest; Snowplow News [online]; [retrieved on Feb. 29, 2012]. Retrieved from the Internet <URL: http://web.archive.org/web/20081226183017/http://www.snowplownews.com/location-commun.html>; 2 pages.

Super-powerful traffic and travel info; Virginia Department of Transportation; 2010 [online]; [retrieved on Feb. 29, 2012]. Retrieved from the Internet <URL: http://www.511virginia.org/Defaultaspx?r=1>; 1 page.

Method for Construction-Induced Pollution Amelioration via Carbon Offset; IBM; IP.com Technical Disclosure IPCOM000183626D; May 29, 2009; 7 pages.

IBM launches 'green' consulting services [online]; iNSnet Foundation Sep. 29, 2008; [retrieved on Feb. 29, 2012]. Retrieved from the Internet <URL: http://web.archive.org/web/20081002035154/http://www.insnet.org/ins_headlines.rsml?id=23782&photo=&title=IBM%20launches%20%green%27%20consulting%services>; 3 pages.

Regan, Keith; Blue Pushes Green With Carbon Offset Modeler [online]; E-Commerce Times (Part of the ECT News Network) originally posted May 22, 2008; [retrieved on Feb. 29, 2012]. Retrieved from the Internet <URL: http:// www.crmbuyer.com/story/63124.html>; 3 pages.

Carbon offset [online]; Wikipeida; [retrieved on Feb. 29, 2012]. Retrieved from the Internet <URL: http://en.wikipedia.org/wiki/Carbon_offset>; 16 pages.

Komanoff, Charles; Auto Fee NYC: A Roadway Pricing Primer; Transportation Alternatives Jul./Aug. 1994 Issue, 4 pages.

Komanoff, Charles; Environmental Consequences of Road Pricing; A Scoping Paper for the Energy Foundation; Apr. 1997; 24 pages.

Peak-time Driving Tolls Limit Pollution, Traffic [online]; AzCentral.com; [retrieved on Aug. 14, 2008]. Retrieved from the Internet <URL:http://www.azcentral.com/arizonarepublic/local/articles/2008/08/08/20080809earthtalk080>; 1 page.

Florida's Turnpike Offers Important Hurricane Evacuation Tips; Florida's Turnpike Enterprise Press Release, Jun. 1, 2006; 2 pages.

State Toll Exemption Policy [online]; [retrieved on Nov. 8, 2010]. Retrieved from the Internet <URL: https://www.txdot.gob/cgi-bin/pfpage_plx>; Texas Department of Transportation; 1 page.

Bob Poole in WSJ on getting rid of Toll Plazas [online]; TollRoadNews; Nov. 6, 2007 [retrieved on Nov. 1, 2010]. Retrieved from the Internet <URL: http//www.tollroadnews.com/node/3232>; 8 pages.

Priewasser, Reinhold; Ecological sustainability and personal behavior: relations demonstrated by the decision-making process of selecting a certain transportation mean; Environmental Management and Health, vol. 10 Issue 3; 1999; 8 pages.

Bjerde et al.; High Level Group on Transport Infrastructure Charging Final Report on Options for Charging Users Directly for Transport Infrastructure Operating Costs; Sep. 9, 1999; 27 pages.

Real-Time Ridesharing Launches on SR 520 to Save Commuters Time, Money; Business Wire; Jan. 27, 2011; 3 pages.

Yglesias, Matt; 1-95 Express Lane Pricing; Apr. 23, 2011; URL http://counterpolitics.com/tag/toll-roads; retrieved from the Internet Jan. 12, 2012; 4 pages.

\* cited by examiner

ENVIRONMENTAL STEWARDSHIP BASED ON DRIVING BEHAVIOR

FIELD OF THE INVENTION

The present invention relates to a data processing method and system for advancing environmental stewardship by improving driving patterns based on driving behavior information, and more particularly to a technique for promoting environmentally-friendly driving patterns via variable incentives and/or variable disincentives based on driving behavior of individual drivers.

BACKGROUND OF THE INVENTION

Areas and routes with traffic congestion usually have the highest amount of pollution in the air. Concentrated pollution is harmful to pedestrians and others that dwell outside in areas with traffic congestion. Conventional traffic congestion management techniques apply a macroscopic perspective that limits the basis of congestion management actions to a narrow collection of driving information that is aggregated over a large group of drivers rather than specific and unique behaviors of individual drivers. Thus, there exists a need to overcome at least one of the preceding deficiencies and limitations of the related art.

SUMMARY OF THE INVENTION

The present invention provides a method of managing driving patterns by charging a variable toll based on individual driving behaviors. The method comprises:

receiving proximity data detected at a first time within a time period P by a plurality of proximity sensor systems included in a plurality of vehicles, wherein the proximity data includes a one or more distances between a vehicle and a plurality of vehicles, and wherein a distance of the one or more distances is a measure of distance between the vehicle and another vehicle immediately in front of the vehicle;

storing the proximity data as part of driving behavior data, wherein the driving behavior data includes other proximity data that includes the one or more distances measured at other times within the time period P;

identifying N tailgating incidents within the time period P, wherein N≥1, wherein identifying N tailgating incidents is based on one or more determinations that the distance is less than a first predefined threshold value for a tailgating distance, and wherein identifying N tailgating incidents is based on the proximity data and the other proximity data;

detecting that the vehicle arrives at a toll-charging station;

a processor of a computer system determining a variable toll T by evaluating a function $f$, wherein the function $f$ is a function of B and N, wherein B is a base amount, and wherein a result of evaluating the function $f$ is a value of T selected from the group consisting of a first value less than B and a second value greater than B; and charging a driver of the vehicle the variable toll T, wherein charging the driver the variable toll T includes providing an incentive to the driver to encourage a first driving behavior if the result of evaluating the function $f$ is the first value and providing a disincentive to the driver to deter a second driving behavior if the result of evaluating the function $f$ is the second value.

A system, program product and process for supporting computing infrastructure corresponding to the above-summarized method is also described and claimed herein.

The present invention provides a technique for drivers to increase their contributions to environmental stewardship by charging variable tolls based on behaviors of individual drivers.

DETAILED DESCRIPTION OF THE INVENTION

Overview

Figure 1:
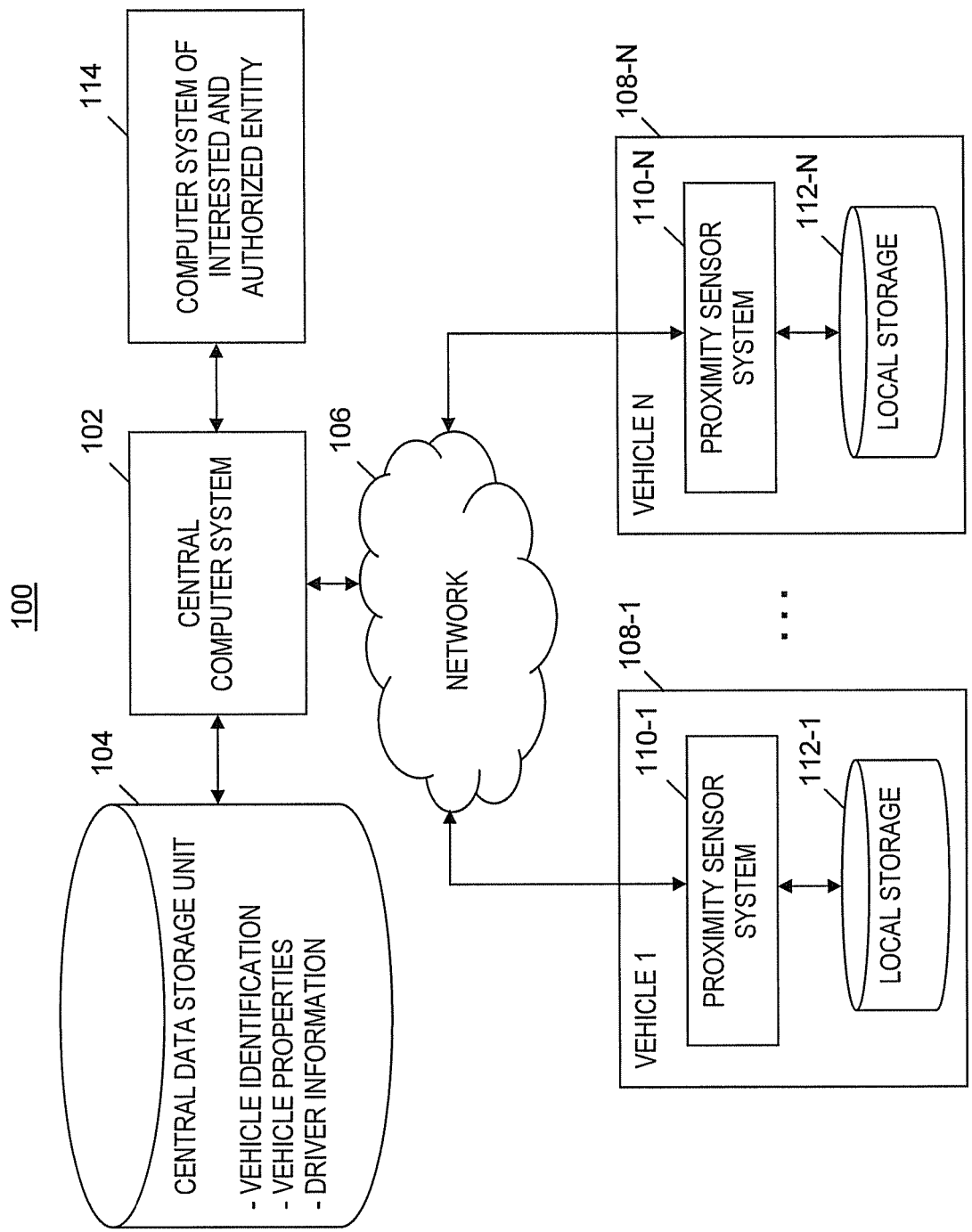
FIG. 1 is a block diagram of a system for managing driving patterns by providing variable incentives and/or variable disincentives based on individual driving behaviors, in accordance with embodiments of the present invention.

Drivers that engage in certain behaviors tend to produce more pollution. For example, tailgating tends to accentuate traffic slowdowns due to over correction of speed, which in turns causes more drivers to go through a cycle of braking and accelerating. As used herein, tailgating is defined as driving a vehicle hazardously closely behind another vehicle, so as to prevent the vehicle from easily stopping or swerving to avoid a collision with the other vehicle. This driving pattern of tailgating expends more pollution than the driver who maintains a greater, non-tailgating distance between the driver's vehicle and other vehicles, and therefore has a more steady speed and less braking and acceleration.

The present invention satisfies a need to provide information to drivers that indicates how green (i.e., environmentally beneficial) their driving techniques are and to provide recommendations regarding how to improve their driving techniques. Furthermore, in one embodiment, the present invention provides the aforementioned information to drivers in the form of incentives to encourage environmentally sound driving techniques (e.g., provide a rebate to a driver whose number of tailgating incidents in a predefined time period is below a predefined threshold) and/or disincentives to discourage environmentally unsound driving techniques (e.g., charge an increased toll to a driver whose number of tailgating incidents in a predefined time period exceeds a predefined threshold).

The value of one of the above-mentioned incentives or disincentives is variable and individualized. That is, an incentive or disincentive in the present invention is a function of driving behavior data that is collected for an individual driver and may be compared to one or more predefined threshold values. Thus, an evaluated incentive or disincentive for Driver 1 may be different from the evaluated incentive or disincentive for Driver 2 if the driving behavior data collected for Driver 1 is different from the driving behavior data collected for Driver 2. Furthermore, the value of an incentive or disincentive in the present invention is not exclusively based on driving behavior data that is aggregated over multiple drivers (e.g., an average speed of multiple drivers using a toll road during a particular time period).

In one embodiment, the driving behavior data collected for individual drivers and their vehicles is collected in real-time by sensor systems residing in the vehicles. The processing of data to determine a value of an incentive or disincentive for a particular driver includes processing the driving behavior data collected in real-time for the driver and may also include processing historical data that indicates the driving behavior of the driver in the past (e.g., number of tailgating incidents recorded in the previous 15 minutes, or the number of times in the last month the driver received a report indicating that the number of tailgating incidents exceeded a predefined threshold).

System for Managing Driving Patterns

FIG. 1 is a block diagram of a system for managing driving patterns by providing variable incentives and/or variable disincentives based on individual driving behaviors, in accordance with embodiments of the present invention. System 100 includes a central computer system 102, a central data storage unit 104, a network 106, and N vehicles 108-1, . . . , 108-N, where each vehicle includes a proximity sensor system (see, e.g., proximity sensor system 110-1 and 110-N) and local data storage unit (see, e.g., local storage 112-1 and 112-N). System 100 also includes a computer system 114 of an interested and authorized entity.

Central computer system 102 manages central data storage unit 104, which may include vehicle identification (e.g., vehicle identification numbers (VINs)), vehicle properties, and driver information, including historical information about past driver behavior of individual drivers. Central data storage unit 104 may store contextual information, such as road and traffic conditions that affect one or more threshold values for determining an incentive or disincentive for managing driving patterns, or that determine whether such an incentive or disincentive is evaluated at all. Data, including driving behavior of individual drivers collected in real-time, is received by central computer system 102 from proximity sensor systems (e.g., proximity sensor system 110-1 and 110-N) via network 106.

A report generated by central computer system 102 may be received by a proximity sensor system (e.g., system 110-1 or 110-N) via network 106 or by another computing or electronic device (e.g., smartphone) that allows the report to be viewed by a driver. The reports received by the proximity sensor systems or other computing or electronic device may include information about the driving behavior of an individual driver (e.g., tailgating incidents recorded in a predefined time period for a driver) and information about an incentive and/or disincentive that the interested and authorized entity or other entity will provide to the individual driver.

In one embodiment, central computer system 102 is a single computing unit. In another embodiment, central computer system 102 includes multiple computing units.

Computer system 114 may access central data storage unit 104 via central computer system 102. In one embodiment, computer system 114 is a single computing unit. In another embodiment, computer system 114 includes multiple computing units. In an alternate embodiment (not shown), computer system 114 may be the same as central computer system 102.

Functionality provided by the components of system 100 is further described below relative to the discussions of FIG. 2 and FIG. 3.

Process for Managing Driving Patterns

Figure 2:
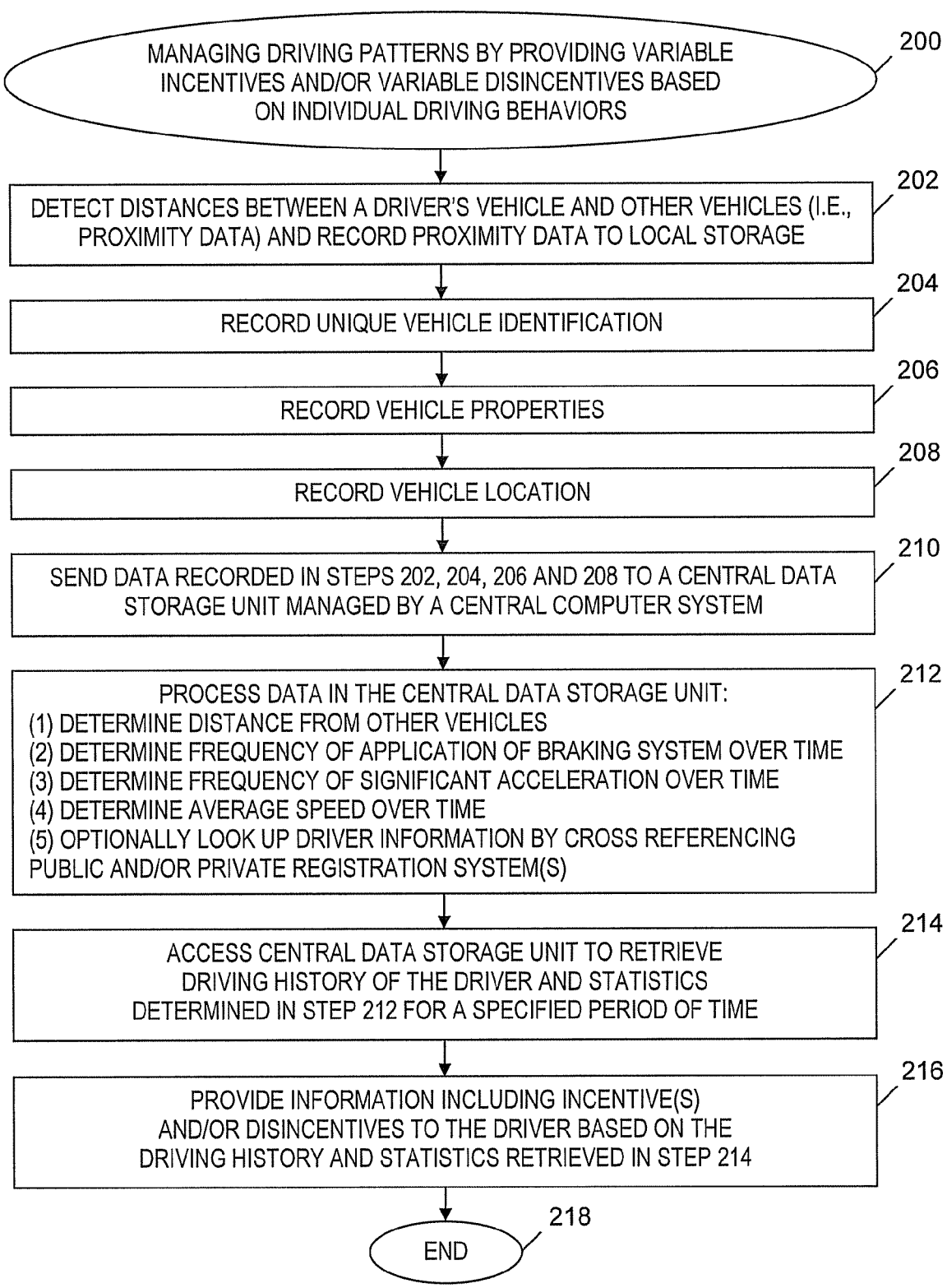
FIG. 2 is a flowchart of a process for managing driving patterns by providing variable incentives and/or variable disincentives based on individual driving behaviors, where the process is implemented by the system of FIG. 1, in accordance with embodiments of the present invention.

FIG. 2 is a flowchart of a process for managing driving patterns by providing variable incentives and/or variable disincentives based on individual driving behaviors, where the process is implemented by the system of FIG. 1, in accordance with embodiments of the present invention. The process for managing driving patterns by providing variable incentives and/or variable disincentives based on individual driving behaviors starts at step 200.

In step 202, a proximity sensor system included in, or otherwise being transported by, a first vehicle detects distance (s) between the first vehicle and one or more other vehicles that are closest to the first vehicle in one or more predefined directions relative to the first vehicle. Also in step 202, the proximity sensor system stores the aforementioned detected distance(s) in a local data storage unit included in or otherwise being transported by the first vehicle.

The detected distances are also referred to herein as proximity data. Hereinafter, in the discussion of FIG. 2, the proximity sensor system that performs the detecting in step 202 is referred to as "the proximity sensor system." Hereinafter, in the discussion of FIG. 2, the vehicle in step 202 that includes the proximity sensor system is referred to as "the vehicle." Hereinafter, in the discussion of FIG. 2, the driver of the vehicle is referred to as "the driver."

In one embodiment, in step 202, the proximity sensor system detects and stores (1) a first distance between the vehicle and another vehicle immediately in front of the vehicle; (2) a second distance between the vehicle and another vehicle immediately behind the vehicle; (3) a third distance between the vehicle and another vehicle immediately to the left of the vehicle (i.e., on the left side of the driver); and (4) a fourth distance between the vehicle and another vehicle immediately to the right of the vehicle (i.e., on the right side of the driver). As used herein, a first vehicle (i.e., the aforementioned "another vehicle") is "immediately" in a specified direction (i.e., in front of, behind, to the left, or to the right) relative to a second vehicle (i.e., the aforementioned "the vehicle") if a proximity sensor system in the second vehicle detects the first vehicle in the specified direction.

For example, proximity sensor system 110-1 (see FIG. 1) detects a first distance between vehicle 108-1 (see FIG. 1) and another vehicle 110-N (see FIG. 1) immediately in front of vehicle 108-1 (see FIG. 1); a second distance between vehicle 108-1 (see FIG. 1) and another vehicle (not shown) immediately behind vehicle 108-1 (see FIG. 1); a third distance between vehicle 108-1 (see FIG. 1) and another vehicle (not shown) immediately to the left of vehicle 108-1 (see FIG. 1); and (4) a fourth distance between vehicle 108-1 (see FIG. 1) and another vehicle (not shown) immediately to the right of vehicle 108-1 (see FIG. 1).

In another embodiment, a proper subset of the distances listed above in (1), (2), (3) and (4) is detected and stored in step 202.

In step 204, the proximity sensor system records a unique identification of the vehicle. For example, step 204 may record a VIN or a license plate number that identifies the vehicle.

In step 206, the proximity sensor system records properties (a.k.a vehicle properties) of the vehicle. For example, the vehicle properties recorded in step 206 may include the make, model and modifications of the vehicle.

In step 208, the proximity sensor system records the location of the vehicle. The location of the vehicle may be determined, for example, by a Global Positioning System (GPS) or by cellular triangulation.

In another embodiment, a combination of steps 204, 206 and 208 is optional.

In step 210, the proximity sensor system sends the data recorded in steps 202, 204, 206 and 208 to central computer system 102 (see FIG. 1). In response, the central computer system stores the data sent in step 210 to central data storage unit 104 (see FIG. 1). Step 210 sends the data, for example, by cellular or other wireless transmission via network 106 (see FIG. 1).

Steps 202 and 210 and optionally steps 204, 206 and 208 are periodically repeated at predefined time intervals within a predefined time period.

In step 212, central computer system 102 (see FIG. 1) processes data in central data storage unit 104 (see FIG. 1). The processing of data in step 212 may include any combination of the following steps to determine statistics and/or driver information:

1. Determining, over a predefined time period, the distances detected between the vehicle and one or more other vehicles immediately in the front, behind, to the left, and/or to the right of the vehicle. In one embodiment, one or more weights may be assigned to one or more of the distances determined in step 212, so that, for instance, the distance to the other vehicle immediately in the front of the vehicle has a more significant effect on the value of an incentive or disincentive as compared to the effect of one or more other distances (e.g., the distance to another vehicle immediately to the right of the vehicle).
2. Determining a frequency over a predefined time period of the driver applying a braking system to slow down the vehicle.
3. Determining a frequency over a predefined time period of the driver significantly accelerating, where a significant acceleration is based on predefined criteria.
4. Determining an average speed of the vehicle over a predefined time period.
5. Optionally looking up driver information, including driver information available by cross referencing public and/or non-public vehicle registration systems. The driver information may include historical driving behavior data that characterizes how much the driver exhibits predefined driving behavior such as tailgating. Driver information that characterizes a first driver as a habitual tailgater according to predefined criteria may, for example, cause a higher toll be charged as a disincentive (see step 216) as compared to a toll charged to a second driver whose driver information indicates that the second driver rarely tailgates according the predefined criteria.

In step 214, computer system 114 (see FIG. 1) of an interested and authorized entity accesses central data storage unit 104 (see FIG. 1) via central computer system 102 (see FIG. 1) to retrieve the driving history of the driver and, for a specified period of time P, the distances and statistics determined in step 212.

In another embodiment, computer system 102 (see FIG. 1) accesses central data storage unit 104 (see FIG. 1) to retrieve the distances determined in step 212, optionally retrieve one or more of the statistics determined in step 212, and optionally retrieve driver history information that classifies the driver in terms of how safe the driver has been in the past.

In step 216, computer system 102 (see FIG. 1) and/or computer system 114 (see FIG. 1) provides information to the driver that includes an incentive to encourage a desired driving behavior or as a disincentive to deter an undesired driving behavior. The information provided in step 216 may also include a message or a report presented to the driver. Step 216 consists of four sub-steps (not shown): 216-1, 216-2, 216-3 and 216-4. In step 216-1, computer system 102 (see FIG. 1) identifies N tailgating incidents within time period P, where N is greater than or equal to 1. In one embodiment, the N tailgating incidents are identified by the computer system 102 (see FIG. 1) comparing distances accessed in step 214 to one or more predefined threshold values. Based on the comparison of the distances, the computer system 102 (see FIG. 1) determines that each distance of N distances out of M distances retrieved in step 214 exceeds a predefined threshold value V1 for determining a tailgating incident. Thus, the determination of the N distances identifies N incidents of the driver tailgating within time period P. In the embodiment described in this paragraph, M is greater than 1 and N is greater than or equal to one.

In step 216-2, computer system 102 (see FIG. 1) detects a condition associated with the vehicle and/or the driver (e.g., a location of the vehicle) that indicates that the driver of the vehicle is to receive an incentive and/or a disincentive that manages the driver's driving behavior (e.g., an incentive that promotes an environmentally sound driving technique or a disincentive that deters an environmentally unsound driving technique). For example, the computer system detects that the vehicle is present at a toll-charging station at which the driver is charged a decreased toll as an incentive or an increased toll as a disincentive. As another example, the computer system detects that the vehicle or driver is present at a business that can provide an incentive in the form of a rebate or reimbursement to the driver.

In step 216-3, computer system 102 (see FIG. 1) determines a variable incentive or disincentive amount by evaluating a function $f$. The function $f$ is a function of a base value (a.k.a. base amount) B and N (i.e., the number of tailgating incidents identified in step 216-1). Function $f$ may further be a function of the driving history and/or the statistics retrieved in step 214. In one embodiment, computer system 102 (see FIG. 1) instructs computer system 114 (see FIG. 1) that information needs to be presented to the driver in step 216-4 based on the evaluation of the function $f$ in step 216-3.

In step 216-4, computer system 102 (see FIG. 1) or computer system 114 (see FIG. 1) provides information including incentive(s) and/or disincentive(s) to the driver based on the evaluation of function $f$ in step 216-3. An incentive provided in step 216-4 encourages a first driving behavior (e.g., driving without tailgating) by the driver. That is, an incentive provided in step 216-4 increases the likelihood that the driver will engage in an environmentally sound driving behavior (e.g., driving without tailgating). A disincentive provided in step 216-4 deters a second driving behavior (e.g., tailgating) by the driver. That is, a disincentive provided in step 216-4 decreases the likelihood that the driver will engage in an environmentally unsound driving behavior (e.g., tailgating). In one embodiment, performing step 216-4 for a first driver and a second driver may provide the first driver with an incentive to encourage a first driving behavior and the second driver with a disincentive to deter a second driving behavior. Furthermore, the aforementioned first driving behavior may be described as not including an attribute of the aforementioned second driving behavior. For example, the first driving behavior is driving that does not include tailgating and the second driving behavior is driving that includes tailgating.

The process of FIG. 2 ends at step 218.

In one embodiment (hereinafter, the toll embodiment), step 216 provides an incentive or a disincentive in the form of a variable toll T. In the toll embodiment, detecting the condition in step 216-2 includes the computer system detecting that the vehicle arrives at a toll-charging station. In the toll embodiment, the variable incentive or disincentive amount determined in step 216-3 is the variable toll T. Evaluating the function $f$ in step 216-3 in the toll embodiment results in a value of variable toll T that is less than B, a value of T that is greater than B, or a value of T that is equal to B. In the toll embodiment, the base value B is a base toll amount charged to drivers having common characteristics based on predefined criteria. For example, a base toll amount may be charged to all drivers who entered a highway at the same entrance, arrive at the same toll-charging station, and drive vehicles of the same class. Step 216-4 in the toll embodiment includes charging the driver of the vehicle the variable toll T. In the toll embodiment, if the value of T is evaluated in step 216-3 to be less than B, then charging the variable toll T in step 216-4 provides an incentive to the driver to encourage a predefined desired driving behavior that includes driving without tailgating. Furthermore, if the value of T is evaluated in step 216-3 to be greater than B, then charging the variable toll T in step 216-4 provides a disincentive to the driver to deter a predefined undesired driving behavior that includes tailgating.

As a first example in the toll embodiment, evaluating function $f$ in step 216-3 results in toll $T=B+N-1$. If there are two tailgating incidents in a time period P (i.e., $N=2$), then $T=B+2-1$ or $T=B+1$ (i.e., the toll increases to one unit more than the base toll amount as a disincentive resulting from the two tailgating incidents). If there are 0 tailgating incidents in a time period P (i.e., $N=0$), then $T=B+0-1$ or $T=B-1$ (i.e., the toll decreases to one unit less than the base toll amount as an incentive resulting from the zero tailgating incidents).

As a second example in the toll embodiment, evaluating function $f$ in step 216-3 results in toll $T=B+wN-1$, where $w$ is a weighting factor such as 0.5. If there are 3 tailgating incidents in a time period P (i.e., $N=3$) and $w=0.5$, then $T=B+0.5*3-1$ or $T=B+0.5$ (i.e., the toll increases to 0.5 units more than the base toll amount as a disincentive resulting from the three tailgating incidents). If there are 0 tailgating incidents in a time period P (i.e., $N=0$) and $w=0.5$, then $T=B+0.5*0-1$ or $T=B-1$ (i.e., the toll decreases to one unit less than the base toll amount as an incentive resulting from the zero tailgating incidents).

As discussed above, the function $f$ evaluated in step 216-3 may also be a function of one or more of the other statistics (e.g., frequency of applying braking system, frequency of significant acceleration, and/or average speed) determined in step 212. In a variation of the toll embodiment, if a statistic of step 212 indicates an undesirable driving behavior based on predefined criteria (e.g., over a time period P, the statistic exceeds a predefined threshold value associated with the statistic), then toll T is increased (e.g., by adding a predefined disincentive amount), and if the statistic of step 212 indicates a desirable driving behavior (e.g., over a time period P, the statistic does not exceed the associated predefined threshold value), then toll T is decreased (e.g., by subtracting a predefined incentive amount).

In another variation of the toll embodiment, step 216 includes adjusting the toll T to be based on driver history information retrieved in step 214. For example, if N exceeds a predetermined threshold V2 to indicate an excessive amount of tailgating in time period P, but the driver history information classifies the driver as a safe driver that has seldom tailgated in the past according to predefined criteria, then the toll T determined by the evaluation of function $f$ in step 216-3 is decreased (e.g., by subtracting a predefined incentive amount) As another example, if N exceeds V2 and the driver history information classifies the driver as an unsafe driver that has been a habitual tailgater in the past according to the predefined criteria, then the toll T determined in step 216-3 is increased (e.g., by adding a predefined disincentive amount).

A toll payment paid by a driver as a disincentive provided in step 216 may be received by one or more entities, such as:

1. a nonprofit organization, carbon offset provider, safety organization, etc.
2. another driver (offended party or payee) who was disadvantaged (e.g., being tailgated) by the driver (offending party or payor) who is paying the toll. In one embodiment, the identity of both the offending party and the offended party are known to a third party service, and the third party service may provide compensation anonymously, where neither the offending party nor the offended party is identified to the other party. The identity of the offending and offended parties may be provided by self-reporting into the system, by the reading of license plates, etc.
3. the aforementioned third party service that coordinates payment between the payor and the payee.

In one embodiment, the process of FIG. 2 prior to step 214 also includes a step (not shown) in which central data storage unit 104 (see FIG. 1) receives contextual information that includes, for example, aggregate distances between other vehicles in a predefined proximity to the vehicle, road conditions and/or traffic conditions that affect one or more threshold values for determining a value of an incentive or disincentive (see step 216) for managing driving patterns, or that determine whether such an incentive or disincentive is evaluated at all.

The contextual information allows the distances processed in step 212 to be analyzed relative to the aggregate distances between other vehicles in proximity to the vehicle. After the contextual information is received by central data storage unit 104 (see FIG. 1), step 214 includes computer system 114 (see FIG. 1) accessing the contextual information and step 216 includes computer system 114 (see FIG. 1) determining a value of an incentive or a value of a disincentive (or determining whether there will be any incentive or disincentive) based on the contextual information as well as on the driving history and data processed in step 212.

The amount of a toll charged to a driver in step 216 may be adjusted (e.g., determined to be a base amount instead of a greater amount associated with excessive tailgating) because the accessed contextual information indicates that the relatively close distances determined in step 212 were part of a widespread pattern over a significant number of nearby vehicles and were presumably unavoidable or appropriate under the circumstances due to roadwork, a slowdown because of an accident, etc.

Variable Tolls

Figure 3:
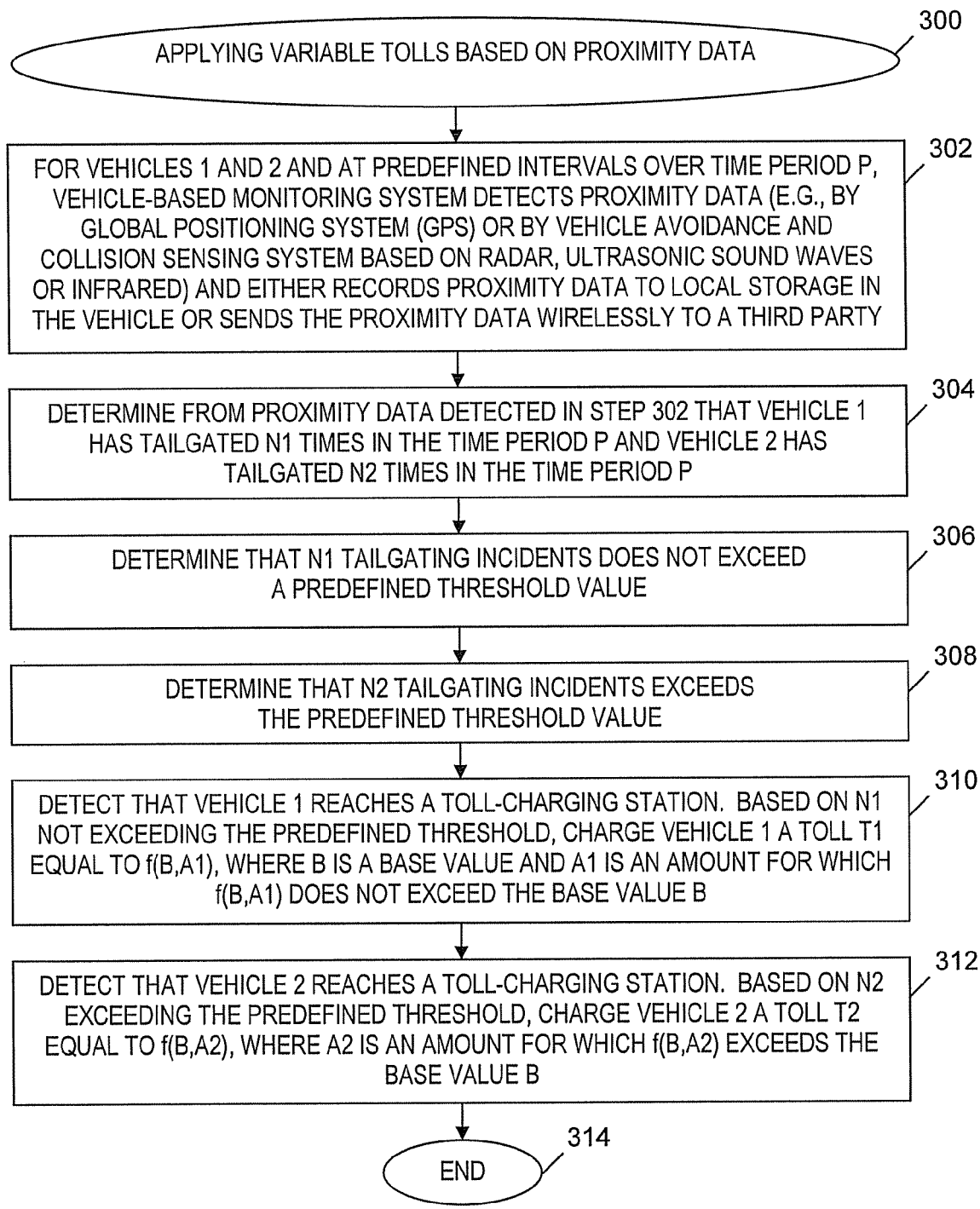
FIG. 3 is a flowchart of a process for applying variable tolls, where the process is implemented by the system of FIG. 1, in accordance with embodiments of the present invention.

FIG. 3 is a flowchart of a process for applying variable tolls, where the process is implemented by the system of FIG. 1, in accordance with embodiments of the present invention. The process of applying variable tolls based on proximity data starts at step 300. In step 302, for Vehicle 1 and Vehicle 2 (collectively, "the vehicles"), at predefined intervals over a time period P, the vehicles' respective monitoring systems (e.g., proximity sensor system 110-1 in FIG. 1) detect proximity data. The proximity data is detected, for example, by a GPS or by a vehicle avoidance and collision sensing system based on radar, ultrasonic sound waves or infrared.

Also in step 302, each of the vehicles' respective monitoring systems record the detected proximity data in a local data storage unit residing in the vehicle (e.g., local storage 112-1 in FIG. 1) or send the detected proximity data over a wireless network to a third party.

For example, step 302 includes proximity sensor system 110-1 (see FIG. 1) in Vehicle 1 (i.e., vehicle 108-1 in FIG. 1) detecting a first set of proximity data at predefined intervals over time period P and storing the detected first set of proximity data in local storage 112-1 (see FIG. 1), and a proximity sensor system in Vehicle 2 detecting a second set of proximity data at the predefined intervals over time period P and storing the second set of proximity data in local storage residing in Vehicle 2.

In step 304, the central computer system 102 (see FIG. 1) determines from the proximity data detected in step 302 that Vehicle 1 has tailgated N1 times in the time period P (e.g., 1 tailgating incident in the previous 15 minutes) and that Vehicle 2 has tailgated N2 times in the time period P (e.g., 10 tailgating incidents in the previous 15 minutes).

In step 306, the central computer system 102 (see FIG. 1) determines that N1 tailgating incidents in a time period P does not exceed a predefined threshold value.

In step 308, the central computer system 102 (see FIG. 1) determines that N2 tailgating incidents in a time period P exceeds the predefined threshold value.

In step 310, the central computer system 102 (see FIG. 1) detects that Vehicle 1 reaches a toll-charging station (e.g., based on data from an electronic toll collection system such as E-ZPass, GPS tracking, or other means). Based on N1 not exceeding the predefined threshold value (see step 306), the driver of Vehicle 1 is designated as a safe driver and central computer system 102 (see FIG. 1) sends a signal to a toll-charging component of computer system 114 (see FIG. 1) to instruct the toll-charging component to charge Vehicle 1 a toll T1 equal to a function of base value B and an amount A, where A does not cause toll T1 to be more than the base value B. For example, toll T1 is charged as base amount B (i.e., T1=B+A, where A=0 and B is the amount charged to drivers who are designated as being safe drivers).

In step 312, the central computer system 102 (see FIG. 1) detects that Vehicle 2 reaches a toll-charging station (e.g., again based on data from an electronic toll collection system such as E-ZPass, GPS tracking, or other means). Based on N2 exceeding the predefined threshold value (see step 308), central computer system 102 (see FIG. 1) sends a signal to the toll-charging component of computer system 114 (see FIG. 1) to instruct the toll-charging component to charge Vehicle 2 a toll T2 equal to the function of base value B and amount A, where A causes toll T2 to be more than the base value B. For example, toll T2 is charged as base value B increased by an amount A (i.e., T=B+A, where A>0). Thus, toll T1 charged in step 310 to a first driver is less than toll T2 charged in step 312 to a second driver, thereby illustrating how tolls calculated by the present invention are variable and individualized. The amount A added to the toll T2 is information provided that makes the driver of Vehicle 2 aware of the driver's tailgating driving behavior and is a disincentive that discourages the driver from tailgating in the future. If the driver of Vehicle 2 decreases tailgating behavior in the future based on receiving the information, traffic congestion is decreased and environmental stewardship is advanced. Furthermore, the amount A added to the toll T2 provides the driver of Vehicle 2 with an opportunity to increase the driver's contribution to environmental stewardship. For example, a percentage of the toll charged to the driver of Vehicle 2 may be automatically redirected to a carbon-offset provider. The process of FIG. 3 ends at step 314.

Computer System

Figure 4:
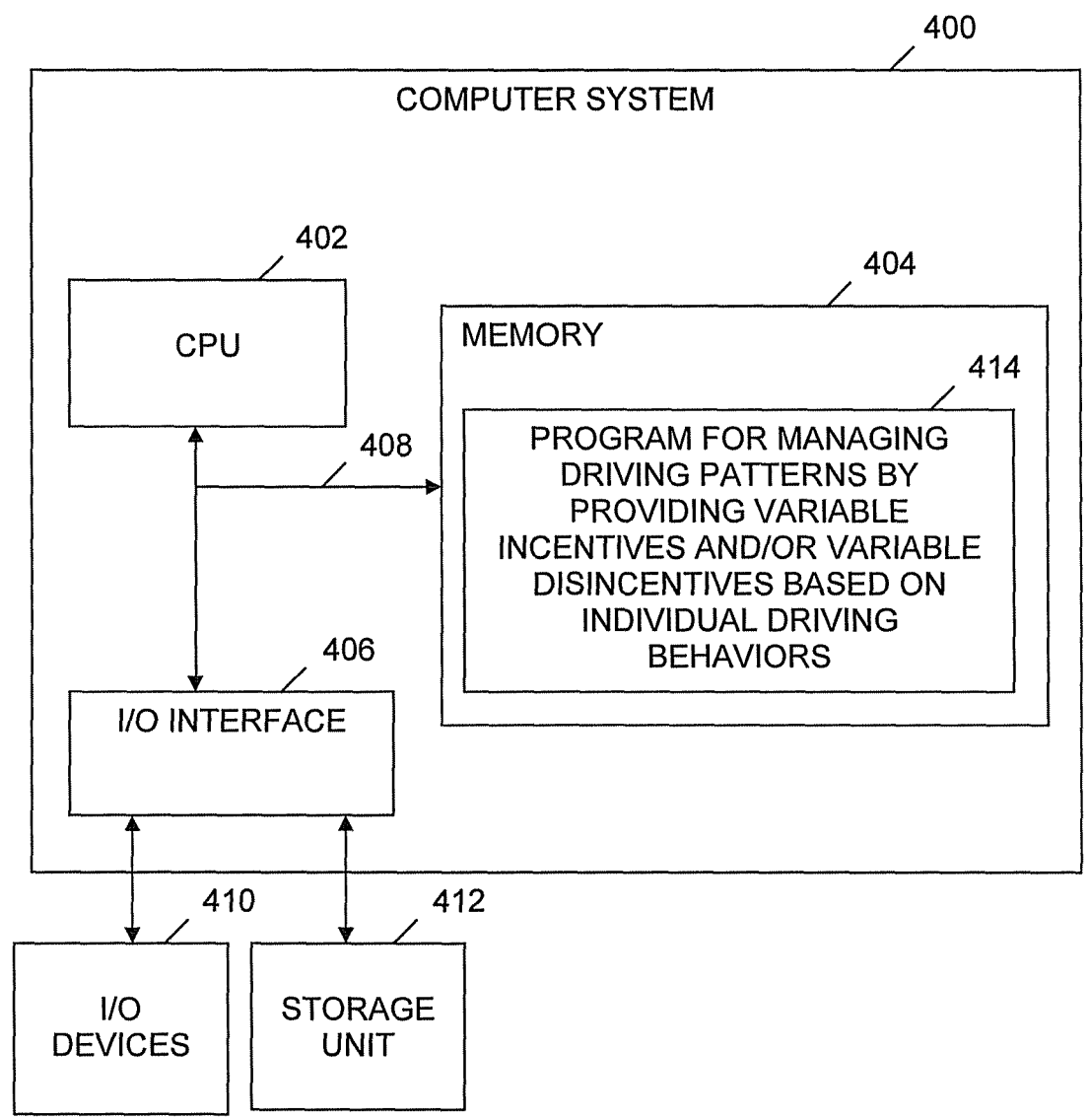
FIG. 4 is a computer system that is included in the system of FIG. 1 and that implements the process of FIG. 2 or FIG. 3, in accordance with embodiments of the present invention.

FIG. 4 is a computer system that is included in the system of FIG. 1 and that implements the process of FIG. 2 or FIG. 3, in accordance with embodiments of the present invention. Computer system 400 generally comprises a central processing unit (CPU) 402, a memory 404, an input/output (I/O) interface 406, and a bus 408. Further, computer system 400 is coupled to I/O devices 410 and a computer data storage unit 412. CPU 402 performs computation and control functions of computer system 400. CPU 402 may comprise a single processing unit, or be distributed across one or more processing units in one or more locations (e.g., on a client and server). In one embodiment, computer system 400 is central computer system 102 (see FIG. 1). In another embodiment, computer system 400 is computer system 114 (see FIG. 1).

Memory 404 may comprise any known computer readable storage medium, which is described below. In one embodiment, cache memory elements of memory 404 provide temporary storage of at least some program code (e.g., program code 414) in order to reduce the number of times code must be retrieved from bulk storage while instructions of the program code are carried out. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 400, and may comprise any type of transmission link, including electrical, optical, wireless, etc.

I/O interface 406 also allows computer system 400 to store and retrieve information (e.g., data or program instructions such as program code 414) from an auxiliary storage device such as computer data storage unit 412 or another computer data storage unit (not shown). Computer data storage unit 412 may comprise any known computer readable storage medium, which is described below. For example, computer data storage unit 412 may be a non-volatile data storage device, such as a magnetic disk drive (i.e., hard disk drive) or an optical disc drive (e.g., a CD-ROM drive which receives a CD-ROM disk).

Memory 404 may include computer program code 414 that provides the logic for managing driving patterns by providing variable incentives and/or variable disincentives based on individual driving behaviors (e.g., the process of FIG. 2 or FIG. 3). Further, memory 404 may include other systems not shown in FIG. 4, such as an operating system (e.g., Linux) that runs on CPU 402 and provides control of various components within and/or connected to computer system 400.

Memory 404, storage unit 412, and/or one or more other computer data storage units (not shown) that are coupled to computer system 400 may store a database (e.g., central data storage unit 104 in FIG. 1).

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., computer system 400). Furthermore, an embodiment of the present invention may take the form of a computer program product embodied in one or more computer readable medium(s) (e.g., memory 404 or computer data storage unit 412) having computer readable program code (e.g., program code 414) embodied or stored thereon.

Any combination of one or more computer readable medium(s) (e.g., memory 404 and computer data storage unit 412)

may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 414) embodied on a computer readable medium may be transmitted using any appropriate medium, including but not limited to wireless, wireline, optical fiber cable, RF, etc., or any suitable combination of the foregoing.

Computer program code (e.g., program code 414) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 400 or another computer system (not shown) having components analogous to the components of computer system 400 included in FIG. 4. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2 and FIG. 3) and/or block diagrams of methods, apparatus (systems) (e.g., FIG. 1 and FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 414). These computer program instructions may be provided to a processor (e.g., CPU 402) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 404 or computer data storage unit 412) that can direct a computer (e.g., computer system 400), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 400), other programmable data processing apparatus, or other devices to cause a series of operational steps to be performed on the computer, other programmable apparatus, or other devices to produce a computer implemented process such that the instructions which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of managing driving patterns by providing variable incentives and/or variable disincentives based on individual driving behaviors. Thus, an embodiment of the present invention discloses a process for supporting computer infrastructure, comprising integrating, hosting, maintaining and deploying computer-readable code (e.g., program code 414) into a computer system (e.g., computer system 400), wherein the code in combination with the computer system is capable of performing a process of managing driving patterns by providing variable incentives and/or variable disincentives based on individual driving behaviors.

In another embodiment, the invention provides a business method that performs the process steps of the invention on a subscription, advertising and/or fee basis. That is, a service provider, such as a Solution Integrator, can offer to create, maintain, support, etc. a process of managing driving patterns by providing variable incentives and/or variable disincentives based on individual driving behaviors. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2 and FIG. 3 and the block diagrams in FIG. 1 and FIG. 4 illustrate the architecture, functionality, and operation of possible implementations of systems, methods, and computer program products according to various embodiments of the present invention. In this regard, each block in the flowchart or block diagrams may represent a module, segment, or portion of code (e.g., program code 414), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing driving patterns by charging a variable toll based on individual driving behaviors, comprising:
   receiving proximity data detected at a first time within a time period P by a plurality of proximity sensor systems included in a plurality of vehicles, wherein said proximity data includes a one or more distances between a vehicle and a plurality of vehicles, and wherein a distance of said one or more distances is a measure of distance between said vehicle and another vehicle immediately in front of said vehicle;
   storing said proximity data as part of driving behavior data, wherein said driving behavior data includes other proximity data that includes said one or more distances measured at other times within said time period P;
   identifying N tailgating incidents within said time period P, wherein N≥1, wherein said identifying said N tailgating incidents is based on one or more determinations that said distance is less than a first predefined threshold value for a tailgating distance, and wherein said identifying said N tailgating incidents is based on said proximity data and said other proximity data;
   detecting that said vehicle arrives at a toll-charging station;
   a processor of a computer system determining a variable toll T by evaluating a function f, wherein said function f is a function of B and said N, wherein the value of f is based at least in part on said N, wherein said B is a base amount, and wherein a result of said evaluating said function f is a value of said T selected from the group consisting of a first value less than said B and a second value greater than said B; and
   charging a driver of said vehicle said variable toll T, wherein said charging said driver said variable toll T includes providing an incentive to said driver to encourage a first driving behavior if said result of said evaluating said function f is said first value and providing a disincentive to said driver to deter a second driving behavior if said result of said evaluating said function f is said second value.

2. The method of claim 1, further comprising: receiving contextual information that includes aggregate distances between other vehicles, wherein said other vehicles are in a predefined proximity to said vehicle; determining said contextual information indicates that one or more tailgating incidents of said N tailgating incidents are appropriate based on conditions selected from the group consisting of: road conditions, traffic conditions, and a combination thereof; and adjusting said variable toll T based on said one or more tailgating incidents being indicated as appropriate.

3. The method of claim 1, further comprising: retrieving driving history of said driver; and adjusting said variable toll T based on said driving history.

4. The method of claim 1, further comprising determining a braking frequency over said time period P of said driver applying a braking system in said vehicle, wherein said determining said variable toll T includes evaluating said function f, and wherein said function f is said function of said B and said N and is further a function of said braking frequency.

5. The method of claim 1, further comprising determining an acceleration frequency over said time period P of said driver performing a substantial acceleration according to predefined criteria, wherein said determining said variable toll T includes evaluating said function f, wherein said function f is said function of said B and said N and is further a function of said acceleration frequency.

6. The method of claim 1, further comprising determining an average speed of said vehicle over said time period P, wherein said determining said variable toll T includes evaluating said function f, wherein said function f is said function of said B and said N and is further a function of said average speed.

7. A computer system comprising a processor and a computer-readable memory unit coupled to said processor, said memory unit containing instructions executable by said processor to implement a method of managing driving patterns by charging a variable toll based on individual driving behaviors, said method comprising:
   receiving proximity data detected at a first time within a time period P by a plurality of proximity sensor systems included in a plurality of vehicles, wherein said proximity data includes a one or more distances between a vehicle and a plurality of vehicles, and wherein a distance of said one or more distances is a measure of distance between said vehicle and another vehicle immediately in front of said vehicle;
   storing said proximity data as part of driving behavior data, wherein said driving behavior data includes other proximity data that includes said one or more distances measured at other times within said time period P;
   identifying N tailgating incidents within said time period P, wherein N≥1, wherein said identifying said N tailgating incidents is based on one or more determinations that said distance is less than a first predefined threshold value for a tailgating distance, and wherein said identifying said N tailgating incidents is based on said proximity data and said other proximity data;
   detecting that said vehicle arrives at a toll-charging station;
   determining a variable toll T by evaluating a function f, wherein said function f is a function of B and said N, wherein the value of f is based at least in part on said N, wherein said B is a base amount, and wherein a result of said evaluating said function f is a value of said T selected from the group consisting of a first value less than said B and a second value greater than said B; and
   charging a driver of said vehicle said variable toll T, wherein said charging said driver said variable toll T includes providing an incentive to said driver to encourage a first driving behavior if said result of said evaluating said function f is said first value and providing a disincentive to said driver to deter a second driving behavior if said result of said evaluating said function f is said second value.

8. The computer system of claim 7, wherein said method further comprises: receiving contextual information that includes aggregate distances between other vehicles in a predefined proximity to a second vehicle; determining said contextual information indicates that one or more tailgating incidents of said N tailgating incidents are appropriate based on road conditions or traffic conditions; and adjusting said variable toll T based on said one or more tailgating incidents being indicated as appropriate.

9. The computer system of claim 7, wherein said method further comprises: retrieving driving history of said driver; and adjusting said variable toll T based on said driving history.

10. The computer system of claim 7, wherein said method further comprises determining a braking frequency over said time period P of said driver applying a braking system in said vehicle, wherein said determining said variable toll T includes evaluating said function f, and wherein said function f is said function of said B and said N and is further a function of said braking frequency.

11. The computer system of claim 7, wherein said method further comprises determining an acceleration frequency over said time period P of said driver performing a substantial acceleration according to predefined criteria, wherein said determining said variable toll T includes evaluating said function f, wherein said function f is said function of said B and said N and is further a function of said acceleration frequency.

12. The computer system of claim 7, wherein said method further comprises determining an average speed of said vehicle over said time period P, wherein said determining said variable toll T includes evaluating said function f, wherein said function f is said function of said B and said N and is further a function of said average speed.

13. A computer program product, comprising a computer readable storage medium having a computer readable program code stored therein, said computer readable program code containing instructions executable by a processor of a computer system to implement a method of managing driving patterns by charging a variable toll based on individual driving behaviors, said method comprising:
receiving proximity data detected at a first time within a time period P by a plurality of proximity sensor systems included in a plurality of vehicles, wherein said proximity data includes a one or more distances between a vehicle and a plurality of vehicles, and wherein a distance of said one or more distances is a measure of distance between said vehicle and another vehicle immediately in front of said vehicle;
storing said proximity data as part of driving behavior data, wherein said driving behavior data includes other proximity data that includes said one or more distances measured at other times within said time period P; identifying N tailgating incidents within said time period P, wherein N≥1, wherein said identifying said N tailgating incidents is based on one or more determinations that said distance is less than a first predefined threshold value for a tailgating distance, and wherein said identifying said N tailgating incidents is based on said proximity data and said other proximity data;
detecting that said vehicle arrives at a toll-charging station;
determining a variable toll T by evaluating a function f, wherein said function f is a function of B and said N, wherein the value of f is based at least in part on said N, wherein said B is a base amount, and wherein a result of said evaluating said function f is a value of said T selected from the group consisting of a first value less than said B and a second value greater than said B; and
charging a driver of said vehicle said variable toll T, wherein said charging said driver said variable toll T includes providing an incentive to said driver to encourage a first driving behavior if said result of said evaluating said function f is said first value and providing a disincentive to said driver to deter a second driving behavior if said result of said evaluating said function f is said second value.

14. The program product of claim 13, wherein said method further comprises:
receiving contextual information that includes aggregate distances between other vehicles in a predefined proximity to a second vehicle; determining said contextual information indicates that one or more tailgating incidents of said N tailgating incidents are appropriate based on road conditions or traffic conditions; and adjusting said variable toll T based on said one or more tailgating incidents being indicated as appropriate.

15. The program product of claim 13, wherein said method further comprises: retrieving driving history of said driver; and adjusting said variable toll T based on said driving history.

16. The program product of claim 13, wherein said method further comprises determining a braking frequency over said time period P of said driver applying a braking system in said vehicle, wherein said determining said variable toll T includes evaluating said function f, and wherein said function f is said function of said B and said N and is further a function of said braking frequency.

17. The program product of claim 13, wherein said method further comprises determining an acceleration frequency over said time period P of said driver performing a substantial acceleration according to predefined criteria, wherein said determining said variable toll T includes evaluating said function f, wherein said function f is said function of said B and said N and is further a function of said acceleration frequency.

18. The program product of claim 13, wherein said method further comprises determining an average speed of said vehicle over said time period P, wherein said determining said variable toll T includes evaluating said function f, wherein said function f is said function of said B and said N and is further a function of said average speed.

19. A process for supporting computing infrastructure, said process comprising providing at least one support service for at least one of creating, integrating, hosting, maintaining, and deploying computer-readable code in a computing system comprising a processor, wherein said processor carries out instructions of said code to cause the computing system to perform a method of managing driving patterns by charging a variable toll based on individual driving behaviors, said method comprising:
receiving proximity data detected at a first time within a time period P by a plurality of proximity sensor systems included in a plurality of vehicles, wherein said proximity data includes a one or more distances between a vehicle and a plurality of vehicles, and wherein a distance of said one or more distances is a measure of distance between said vehicle and another vehicle immediately in front of said vehicle; storing said proximity data as part of driving behavior data, wherein said driving behavior data includes other proximity data that includes said one or more distances measured at other times within said time period P;
identifying N tailgating incidents within said time period P, wherein N≥1, wherein said identifying said N tailgating incidents is based on one or more determinations that said distance is less than a first predefined threshold value for a tailgating distance, and wherein said identifying said N tailgating incidents is based on said proximity data and said other proximity data;
detecting that said vehicle arrives at a toll-charging station;

said processor of said computing system determining a variable toll T by evaluating a function f, wherein the value of f is based at least in part on said N, wherein said function f is a function of B and said N, wherein said B is a base amount, and wherein a result of said evaluating said function f is a value of said T selected from the group consisting of a first value less than said B and a second value greater than said B; and charging a driver of said vehicle said variable toll T, wherein said charging said driver said variable toll T includes providing an incentive to said driver to encourage a first driving behavior if said result of said evaluating said function f is said first value and providing a disincentive to said driver to deter a second driving behavior if said result of said evaluating said function f is said second value.

20. The process of claim 19, wherein said method further comprises:

receiving contextual information that includes aggregate distances between other vehicles in a predefined proximity to a second vehicle;

determining said contextual information indicates that one or more tailgating incidents of said N tailgating incidents are appropriate based on road conditions or traffic conditions; and adjusting said variable toll T based on said one or more tailgating incidents being indicated as appropriate.

* * * * *